C. T. RASCHICK.
TICKET HOLDER AND CUTTER.
APPLICATION FILED JUNE 21, 1919.
1,412,893. Patented Apr. 18, 1922.
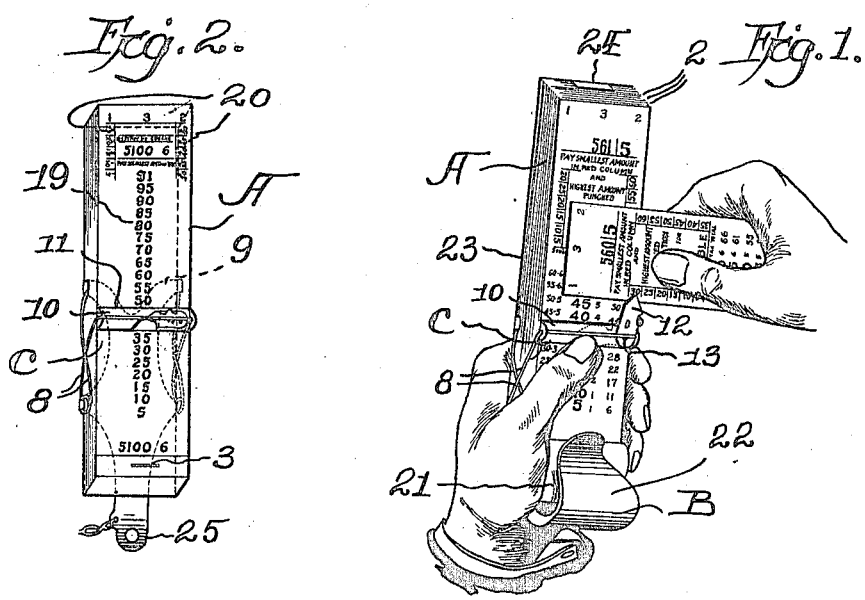
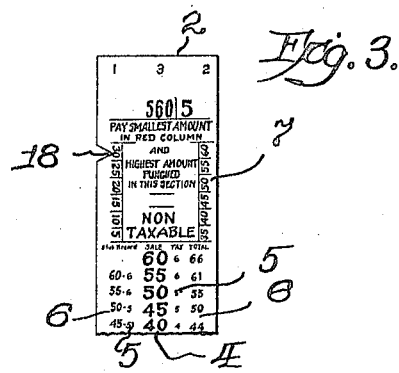
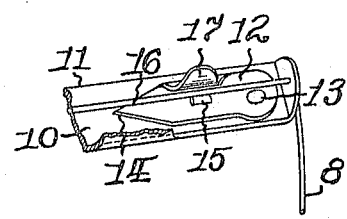
Inventor:
Charles T. Raschick,
by: Howard Fischel,
Attorney.

UNITED STATES PATENT OFFICE.

CHARLES T. RASCHICK, OF ST. PAUL, MINNESOTA.

TICKET HOLDER AND CUTTER.

1,412,893.   Specification of Letters Patent.   Patented Apr. 18, 1922.

Application filed June 21, 1919. Serial No. 305,917.

*To all whom it may concern:*

Be it known that I, CHARLES T. RASCHICK, a citizen of the United States, residing at St. Paul, in the county of Ramsey and State of Minnesota, have invented a new and useful Improvement in Ticket Holders and Cutters, of which the following is a specification.

This invention relates to ticket or check holders, which slidably engage pads of checks under spring tension to hold them in smooth positions ready for use. All of the checks are similar and are secured together by a suitable staple or other means on one end, while the check holder, which is slidably secured to the series or pad of checks, engages over the free ends of the same, being freely movable into various positions so as to set a cutting knife in position to sever one of the checks to indicate the amount of a sale.

The invention further provides two cutting knives, one of which is for the purpose of severing the check from the stub portion at the desired amount indicated on the check face and the other knife being for the purpose of cutting or punching the check to indicate a second amount at a different position on the check. In issuing sales checks, at the present time, it is desirable to indicate the sale amount of certain goods, together with a tax or percentage, while it is also desirable to indicate on the same check a non-taxable sale amount. This holder and cutter is for the purpose of severing and cutting or punching each of the checks so as to indicate such amounts, thus readily issuing a check for a sale amount, including a tax, and also indicating a non-taxable sale amount so that the customer can see, at a glance, what he must pay and which portion of his purchase is taxable or non-taxable.

In the drawing forming part of the specification:

Figure 1 is a perspective view of the holder, as it would appear in use in issuing a check.

Figure 2 is a perspective view of a pad of checks, a portion of the holder being removed therefrom.

Figure 3 is a plan view of one of the checks, as it would appear when issued for a certain amount.

Figure 4 is a perspective view of a detail portion of the holder.

In the drawing the pad of checks, A, which is composed of a series of leaves 2 that are held bound together by a staple 3 on one end, are held by the holder B and the slidable clamp C. Each of the leaves or checks 2 has printed on its face, amounts, which are for the purpose of indicating the amount of a sale.

The column of figures 4, which is positioned centrally in the checks of the pad A, indicates sales amounts, which are taxable, the tax amount being indicated in the column 5 on either side of the column 4 and the total amount to be paid, including the tax on a taxable sale, being indicated in the column 6. These checks in the pad A have a non-taxable series of figures, as indicated by the columns or rows of figures 7, positioned on either side of the upper end of the checks 2. All of the checks are similar in the pad A, except that they are numbered in consecutive order so as to indicate the number of checks in a pad.

The slidable clamp C is provided with spring arms 8 on either side of the same, which hold the back 9 against the bottom of the pad A or against the back of the holder B and hold the transversely extending cutting knife 10 firmly against the face of the checks in the pad so that the forward edge 11 of the same can be positioned below the sale amount indicated in the column 4 and the check severed at this point by the edge 11 of the knife 10 to issue a check for the desired amount of the sale such as is indicated by the check in Figure 3, which is for a taxable sale amount of forty cents. The clamp and cutter C is freely slidable over the pad and also tends to hold the free ends of the leaves of the same smoothly together so that the cutting knife 10 can be moved into the desired position freely. An auxiliary cutter or tearing knife 12 is pivoted at 13 to the upper face of the cutter 10 at one side of the same and is formed with a pointed cutting end 14. The cutting knife 12 is normally held out of operating position against the upper face of the cutter 10 by the detent 15, which engages a transversely extending rod 16 to which the cutter 10 is pivoted. The rod 16 is formed integral with the ends of one of the side spring arms 8 and holds the cutter 10 in position to extend transversely across the surface of the pad A. The space between the upper surface of the blade 10 and the rod 16 is only slightly greater than the thickness of the cutter 12 and thus causes the detent 15, which projects upward from the cutter 12, to engage the rod 16 with sufficient friction to hold the cutter 12 in inoperative position back away from the cutting edge 11 of the knife 10 so as not to interfere with the operation of the same.

A suitable tang or engaging tongue 17 is formed integral with the cutter 12 and projects upward so that it can be freely engaged to draw the cutter into the position illustrated in Figure 1, turning it on its pivot point 13 and disengaging the detent 15 from the rod 16. The detent 15 and the upwardly projecting engaging tang 17 prevent the cutter from moving transversely on the cutting blade and hold it in inoperative position. When the cutter 12 is moved into the position illustrated in Figure 1, the checks 2 can be cut with a V-shaped notch, such as 18, indicated in Figure 3, to indicate the sale amount of non-taxable goods and thus the checks 2 can be issued for both taxable and non-taxable goods, so as to indicate the amount of a sale, say for seventy cents, the taxable portion of the sale being forty cents and the non-taxable portion thirty cents, each of these amounts being indicated separately on the same check and also a tax or percentage amount of the taxable sale, or forty cents, so as to indicate a four cent tax; thus the entire amount to be paid would be seventy-four cents, but either the purchaser or proprietor can see at a glance how much of the sale was taxable and how much was not taxable.

It is obvious that the holder and cutting means may be used for various purposes and not confined to the use for tickets to indicate two separate sales amounts, but that the cutter 10 can be used for severing the check or ticket from the stub and at the same time indicate an amount or figure and the cutter 12 used to cut or notch the ticket for any desired purpose. For instance, the cutter 10 could sever the check and indicate dollars and the auxiliary cutter 12 notch the check to indicate the cents of a sale amount, in this manner issuing a check for dollars and cents of practically any denomination, within a reasonable scope. This holder and check or ticket cutter is convenient for quick use, being simple in operation and eliminating any extra punching means for the tickets, the slidable cutter holding the free ends of the tickets together and in readiness for operation at any time, while the auxiliary cutter can be quickly brought into operation or moved into inoperative position.

The holder B is for the purpose of holding the pad A and particularly for engaging the stub 21 of the issued checks and to hold and contain the same under the spring depressed pivoted tongue 22 so as to hold the stubs of the tickets that have been issued away from the face of the unissued tickets, to allow the clamp C to be moved back and forth into the desired position for operation. The holder B is provided with a back portion 23, which extends along the bottom of the pad A and is formed with a forward upwardly projecting stop 24, which engages against the free ends of the tickets of the pad A to hold the pad in position in the holder B.

The clamp C engages over the back 23 with its cutting blade 10 held against the face of the pad of tickets or checks in the pad A under spring tension of the spring arms 8. It is obvious that the clamp C can be used to hold the pad A without the use of the holder B, if it is so desired, and when used in this manner the clamp C would be preferably formed with an engaging end or tongue 25, which can be engaged by a suitable hook or chain to hold it to the belt of the operator or otherwise engaged to hold the pad, but it is not necessary that the clamp C be formed with the tongue 25 and when used in connection with the holder B it does not require the same, but the clamp C obviously can be used to hold the pad of tickets or checks and also form a slidable cutter, which is free to be moved to the desired position on the pad.

In accordance with the patent statutes I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims:

1. In a device of the class described for attachment to a pad of checks, a cutting blade for extending across the face of said pad and an auxiliary cutter pivoted to said blade having a cutting edge for severing a portion of the checks in said pad.

2. A clamp for slidably engaging a pad of tickets, a transversely extending cutting blade adapted to engage the uppermost ticket of said pad, spring means for holding said blade in engagement with the tickets of said pad, whereby said tickets can be severed by said blade and an auxiliary cutting member pivoted to said blade and adapted to be rotated into operating position so as to engage and sever a portion of the ticket to form an indicating notch in the ticket for the purposes specified.

3. A cutter for a pad of tickets comprising, a slidable clamp having a cutting blade for severing a ticket when it is issued, said cutting blade adapted to sever said tickets to indicate a sale amount and an auxiliary cutter pivoted to said blade having a severing end which is adapted to sever a portion of the ticket to form an indicating means.

4. A ticket cutter comprising a spring clamp having a cutting blade for severing the tickets and an auxiliary cutter pivoted on one end to said blade so as to swing in a horizontal parallel plane with said cutting blade into operating position to form an indicating cut in the issued ticket.

5. A cutting device for a series of bound together checks having amounts printed thereon, comprising a spring clamp having a cutting blade, which is freely slidable over the face of said checks so as to sever said checks to indicate an amount and a second cutter normally held extending longitudinally of said cutting blade and pivoted thereto so as to swing at an angle to the same into operating position, said second cutter being adapted to sever the check after it has been cut by said first cutter to form an indicating notch in the check being issued to indicate a desired amount and means for holding said auxiliary cutter out of operating position on said blade.

6. A slidable cutter for a holder which is adapted to hold a series of tickets, said slidable cutter being adapted to sever the tickets, an auxiliary cutter pivoted to said slidable cutter and means for holding said auxiliary cutter out of operating position and extending longitudinally of said slidable cutter, whereby said slidable cutter can be operated independent of said auxiliary cutter without said auxiliary cutter interfering with the operation of said slidable cutter and said auxiliary cutter can be operated independent of said slidable cutter to form an indicating means in checks issued from said pad.

7. For a ticket holder a slidable spring clamp having a cutting blade pivotally secured to said clamp and held under spring tension against the face of the tickets of said pad in position to sever the tickets in said pad, an auxiliary cutter pivoted to the cutting blade, a cutting point formed on said auxiliary cutter adapted to cut an indicating notch out of the edge of said tickets in issuing the same and operable independent of said blade and frictional engaging means for holding said auxiliary cutter out of operating position to said blade.

8. A ticket cutter for slidably engaging a pad of tickets, including a cutting blade adapted to engage the face of said tickets, spring means for holding said blade in engagement with said tickets, an auxiliary cutter pivoted to the face of said cutting blade and means for holding said auxiliary blade against free movement.

9. In a device of the class described having a cutting blade which is adapted to be slidably held under spring tension to a pad of checks and an auxiliary cutter pivoted to the face of said blade and adapted to operate independent of said blade to form an indicating means in a check for the purposes specified.

10. A slidable cutting means including a spring depressed cutting blade for a pad of tickets, said cutting blade being adapted to sever said tickets transversely across their face, an auxiliary cutting means pivoted to the face of said cutting blade having a cutting point for cutting an indicating notch out of the edge of the tickets, an arm extending across said cutting blade for pivotally holding said blade in position and a detent formed in said auxiliary cutting means for engaging said arm to hold said auxiliary cutting means out of operating position to said cutting blade.

CHARLES T. RASCHICK.